US012596744B2

(12) United States Patent
Guda et al.

(10) Patent No.: US 12,596,744 B2
(45) Date of Patent: Apr. 7, 2026

(54) MULTIMODAL SEARCH ON WEARABLE SMART DEVICES

(71) Applicant: GOOGLE LLC, Mountain View, CA (US)

(72) Inventors: Bhanu Prakash Reddy Guda, Sunnyvale, CA (US); Dia Kharrat, Sunnyvale, CA (US); Anna Galusza, Seattle, WA (US); Vikas Bahirwani, San Francisco, CA (US); Lin Li, Sunnyvale, CA (US); Sarah Padlipsky, Santa Clara, CA (US); Nishtha Bhatia, Fremont, CA (US); Zeina Oweis, San Francisco, CA (US); Yoshida Grant, Sunnyvale, CA (US); Alex Olwal, Santa Cruz, CA (US); Saeed Najafi, Toronto (CA); Johnny Lee, Redmond, WA (US); Xavier Benavides Palos, Beverly Hills, CA (US); Ran Xin, Mountain View, CA (US); Achin Kulshrestha, Toronto (CA); Nikolai Moukhine, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/962,502

(22) Filed: Nov. 27, 2024

(65) Prior Publication Data

US 2025/0225176 A1       Jul. 10, 2025

Related U.S. Application Data

(60) Provisional application No. 63/618,278, filed on Jan. 5, 2024.

(51) Int. Cl.
*G06F 16/532* (2019.01)
*G06F 16/535* (2019.01)

(52) U.S. Cl.
CPC .......... *G06F 16/532* (2019.01); *G06F 16/535* (2019.01)

(58) Field of Classification Search
CPC ............................. G06F 16/532; G06F 16/535
USPC ......................................................... 707/769
See application file for complete search history.

(56) References Cited

U.S. PATENT DOCUMENTS

| | | |
|---|---|---|
| 2015/0088923 A1 | 3/2015 | Garcia-barrio et al. |
| 2021/0294831 A1* | 9/2021 | Klamra ................. G06F 16/535 |
| 2025/0117413 A1* | 4/2025 | Pallakonda ......... G06F 16/3344 |

OTHER PUBLICATIONS

International Search Report and Written Opinion for PCT Application No. PCT/US2025/010059, mailed on Mar. 19, 2025, 13 pages.

(Continued)

*Primary Examiner* — Baoquoc N To

(74) *Attorney, Agent, or Firm* — Brake Hughes Bellermann LLP

(57) ABSTRACT

According to at least one implementation, a method includes obtaining a query at a wearable device and identifying context associated with the query, the context comprising a set of images captured by the wearable device. The method further includes generating at least one search from the query and the context and obtaining at least one result to the at least one search. The method also generates a response to the query based on at least one result and provides the response to a wearable device user.

20 Claims, 7 Drawing Sheets

(56)             References Cited

OTHER PUBLICATIONS

Lee, et al., "Towards Designing a Context-Aware Multimodal Voice Assistant for Pronoun Disambiguation: A Demonstration of GazePointAR", Proceedings ofthe 20th ACM International Conference on Computing Frontiers, ACMPUB27, Oct. 29, 2023, 3 pages.
Lee, et al., "What's This? A Voice and Touch Multimodal Approach for Ambiguity Resolution in Voice Assistants", Proceedings of the 22nd International Middleware Conference, ACMPUBB27, Oct. 18, 2021, pp. 512-520.

* cited by examiner

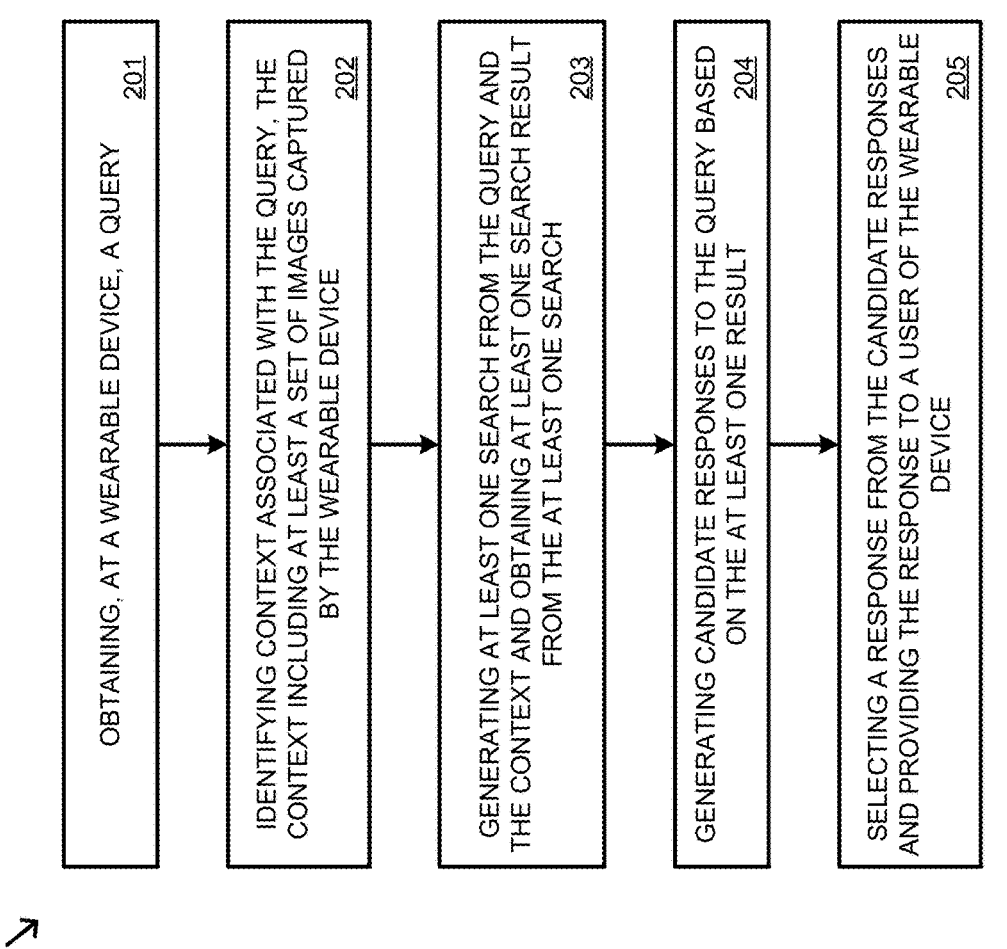

OBTAINING, AT A WEARABLE DEVICE, A QUERY 201

IDENTIFYING CONTEXT ASSOCIATED WITH THE QUERY, THE CONTEXT INCLUDING AT LEAST A SET OF IMAGES CAPTURED BY THE WEARABLE DEVICE 202

GENERATING AT LEAST ONE SEARCH FROM THE QUERY AND THE CONTEXT AND OBTAINING AT LEAST ONE SEARCH RESULT FROM THE AT LEAST ONE SEARCH 203

GENERATING CANDIDATE RESPONSES TO THE QUERY BASED ON THE AT LEAST ONE RESULT 204

SELECTING A RESPONSE FROM THE CANDIDATE RESPONSES AND PROVIDING THE RESPONSE TO A USER OF THE WEARABLE DEVICE 205

MULTIMODAL SEARCH ON WEARABLE SMART DEVICES

RELATED APPLICATIONS

This application claims priority to U.S. Provisional Patent Application No. 63/618,278, filed on Jan. 5, 2024, entitled "MULTIMODAL SEARCH ON WEARABLE SMART DEVICES," the disclosure of which is incorporated by reference herein in its entirety.

BACKGROUND

An extended reality (XR) device incorporates a spectrum of technologies that blend physical and virtual worlds, including virtual reality (VR), augmented reality (AR), and mixed reality (MR). These devices immerse users in digital environments, either by blocking out the real world (VR), overlaying digital content onto the real world (AR), or blending digital and physical elements seamlessly (MR). XR devices include headsets, glasses, or screens equipped with sensors, cameras, and displays that track the movement of users and their surroundings to deliver immersive experiences across various applications such as gaming, education, healthcare, and industrial training.

SUMMARY

This disclosure relates to systems and methods for providing multimodal search on wearable smart devices. In at least one implementation, a multimodal wearable device can be configured to identify a query from a device user. In response to the query, the wearable device can identify context associated with the query, including a set of images captured by the wearable device. In some implementations, the set of images includes images captured in response to the query. In some implementations, the set of images includes images captured before the query. The context can further include information from other sensors and user profile information. The different sensors can include accelerometers, gyroscopes, magnetometers, depth sensors, and environmental sensors to track the device's motion, orientation, depth, and surroundings. The user profile information can include user preferences, conversation histories, or other historical attributes about the user. From the context and the query, the device can generate one or more searches (e.g., web searches) to retrieve results for the query. Once retrieved, the device can determine at least one response to provide to the device user for the query.

In some aspects, the techniques described herein relate to a method including: obtaining, at a wearable device, a query; identifying context associated with the query, the context including a set of images captured by the wearable device; generating at least one search from the query and the context; obtaining at least one result for the at least one search; determining a response to the query based on the at least one result; and providing the response to a user of the wearable device.

In some aspects, the techniques described herein relate to a computing apparatus including: a non-transitory computer-readable storage medium; at least one processor operatively coupled to the non-transitory computer-readable storage medium; and program instructions stored on the non-transitory computer-readable storage medium that, when executed by the at least one processor, direct the computing apparatus to perform a method, the method including: obtaining, at a wearable device, a query; identifying context associated with the query, the context including a set of images captured by the wearable device; generating at least one search from the query and the context; obtaining at least one result for the at least one search; determining a response to the query based on the at least one result; and providing the response to a user of the wearable device.

In some aspects, the techniques described herein relate to a non-transitory computer-readable storage medium having program instructions stored there on that, when executed by at least one processor, direct the at least one processor to perform a method, the method including: obtaining, at a wearable device, a query; identifying context associated with the query, the context including at least one image captured by the wearable device; generating at least one search from the query and the context; obtaining at least one result for the at least one search; determining a response to the query based on the at least one result; and providing the response to a user of the wearable device.

The details of one or more implementations are outlined in the accompanying drawings and the description below. Other features will be apparent from the description, drawings, and claims.

BRIEF DESCRIPTION OF THE DRAWINGS

FIG. 2 illustrates a method of operating a wearable device to support multimodal search according to an implementation.

DETAILED DESCRIPTION

Figure 1:
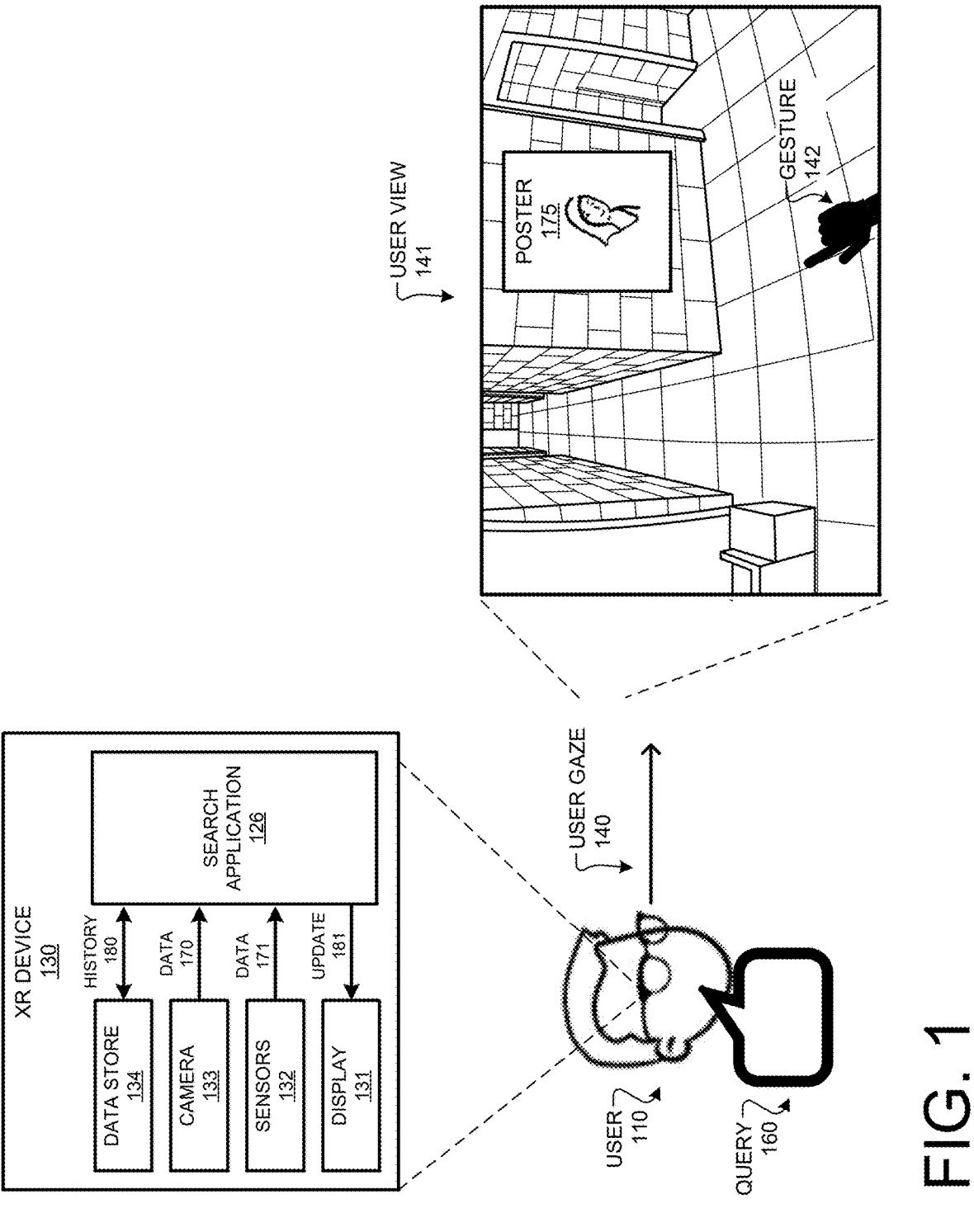
FIG. 1 illustrates a computing environment that supports multimodal search on a wearable device according to an implementation.

Computing devices, such as wearable devices and extended reality (XR) devices, provide users with an effective tool for gaming, training, education, healthcare, and more. An XR device merges the physical and virtual worlds, encompassing virtual reality (VR), augmented reality (AR), and mixed reality (MR) experiences. These devices can include headsets or glasses equipped with sensors, cameras, and displays that track users' movements and surroundings, allowing them to interact with digital content. XR devices offer immersive experiences by either completely replacing the real world with a virtual one (VR), overlaying digital information onto the real world (AR), or seamlessly integrating digital and physical elements (MR). Input to XR devices may be provided through physical gestures, voice commands, controllers, and eye movements. Users interact with the virtual environment by manipulating objects, navigating menus, and triggering actions using these input methods. The device's sensors and algorithms translate these input methods into corresponding digital interactions within the XR space. However, at least one technical problem exists in determining an intent for (understanding) user queries and generating relevant responses to the user queries.

In at least one technical solution, an XR device can be configured to receive a user query on the XR device as part of a search application. The query can be received via one or more microphones on the device, keyboard input to the device, or some other input mechanism. In response to the query, the device can identify additional contextual information (or context) to support a response to the query. The contextual information can include one or more images, identified hand gestures, eye gaze, body pose/posture, device location, recent and current activity, social situation, a relevant object that may be visible in the background or nearby, non-speech background audio, speech affect (emotional/attitude context of the speech), as well as any relevant personal preferences that may be accessible to the device. In some implementations, contextual information is gathered from cameras and other sensors on the device. The different sensors can include accelerometers, gyroscopes, magnetometers, depth sensors, and environmental sensors to track the device's motion, orientation, depth, and surroundings. The gathered information can be relevant to the context of the user query, such as their location, conversation history, and the object/entity of interest to the user. Using the query and the contextual information, the XR device can be configured to generate at least one search. In some examples, the search represents a web search to obtain the required information to respond to the query. Once the information is obtained, the system can generate at least one response to be provided to the user, wherein the response can be provided via a display on the device, provided via one or more speakers on the device, or provided by some other output means.

In some implementations, in processing the query, the system can be configured to identify the entity of interest within the user query. For example, if the user query is "What is the breed of the red-colored dog?" then the entity of interest here would be "red-colored dog." The system can use noun-phrase extraction to identify the entity in some implementations. Noun phrase extraction is a natural language processing technique that identifies entities by extracting noun-centered phrases, helping isolate important subjects, objects, or concepts in the text. In other implementations, the system can use large language models (LLMs) to identify the entity or entities of interest in the query. LLMs identify entities in natural language by analyzing context and patterns within the text, using pre-trained knowledge to recognize and categorize names, places, organizations, and other significant terms as entities.

Once the query is processed, the device can be configured to determine the contextual information relevant to the identified entities. Using the example above, the device can be configured to determine contextually relevant information related to the terms "red-colored dog." This can include images captured from cameras on the device (e.g., outward facing) in response to or before the query. In some examples, the images can include both images captured before the query and images captured after the query. The image or images can be processed to identify or extract the dog from the image and perform a search for the red-colored dog. In some implementations, the system can use one or more web searches that provide information associated with the image or images. A web search using an image, often called a reverse image search, allows the device to upload an image to find information related to that image. This can help identify (or describe) objects, places, or people in the picture, find similar images, track the source, or discover other websites. Web search providers can use specialized tools that allow the device to perform these searches by analyzing visual elements in the image, such as colors, shapes, and patterns, to provide relevant search results or match the image with similar ones in their databases. For example, a web search could return an article or webpage that indicates the breed of the dog. Once the information is gathered from the web search, the device can generate a response to the query based on the result and respond to the user of the wearable device. The response can be provided via the display on the device, an audio output, or some other output for the user. As a technical effect, the device can use the query and the context information to generate a more relevant response for the user.

In some implementations, the device can use a LLM to generate the response for the user. The LLM can process the search results and query by tokenizing and encoding them into numerical representations. It then uses attention mechanisms to determine which parts of the results are most relevant to the query, filtering out unrelated or less important information. The model synthesizes important points from one or more sources, combining the most pertinent details into a coherent response that directly addresses the query. By predicting words in sequence based on its understanding of the context, the LLM can generate a response that effectively captures the main ideas from the search results, ensuring the response is both informative and aligned with the query.

In some implementations, the search application for the device can use a rank and selection operation to determine the response for the query. For example, the search application can sample multiple potential outputs from the LLM by adjusting parameters like temperature (for diversity) and decoding methods (like top-k or nucleus sampling). Each candidate is then produced by repeatedly prompting the model, allowing for variations in phrasing, detail, and approach, creating a range of responses that can be evaluated and ranked. In some examples, candidate responses are scored based on relevance (to the query), accuracy, coherence, completeness, and/or tone. The ranking process can assign scores to each candidate, allowing for a prioritized list, with the highest-ranking response selected as the final answer or response.

Although demonstrated in the previous example using an XR device, similar operations can be performed by other wearable devices. These devices can include headphones, a helmet, a clip-on accessory, a watch, a necklace, an earpiece, a wristband or armband, a belt, and the like. The wearable devices can be capable of identifying a query from a user, identifying context associated with the query, and providing a response to the device user. Although described as implementing the operations locally on the XR device, at least a portion of the operations can be implemented using one or more back-end devices (i.e., servers). For example, the servers can be used to process contextual images or perform LLM tasks.

FIG. 1 illustrates a computing environment 100 that supports multimodal search on a wearable device according to an implementation. Computing environment 100 includes user 110, XR device 130, user gaze 140, and user view 141. XR device 130 further includes display 131, sensors 132, camera 133, data store 134, and search application 126. XR device 130 further includes data 170, data 171, history 180, and update 181. User view 141 is representative of the view for user 110 and includes gesture 142. While demonstrated as being performed locally on XR device 130, search application 126 can be implemented at least partially on one or more back-end devices (i.e., servers). For example, the servers can be used to process contextual images or perform LLM tasks.

In computing environment 100, XR device 130 includes display 131 which is a screen or projection surface that presents immersive visual content to user 110, merging virtual elements with the real world or creating a completely virtual environment. XR device 130 further includes sensors 132 including accelerometers, gyroscopes, magnetometers, depth, infrared, and proximity sensors. The sensors can be used to monitor the user's physical movement (movement and location data), identify depth information for other objects, identify eye movement for the user (e.g., eye gaze data), or provide some other operation. XR device 130 also includes camera 133 that can capture the real or physical environment to overlay virtual objects (e.g., application interfaces) seamlessly and for tracking movements of user 110 and surroundings to enable accurate interaction within the augmented or virtual space. In some examples, camera 133 can be positioned as an outward view to capture the physical world associated with the user's gaze. Display 131 can receive an update 181 from search application 126 to provide search results related to a user query. In some implementations, rather than delivering the result as a display on XR device 130 the result can be provided as an audio output on the device.

In the example of computing environment 100, user 110 generates a query that is captured by XR device 130. In some implementations, the query comprises a voice query captured by a sensor of sensors 132. In some implementations, the query is entered via a keyboard or some other mechanism. In response to the query, search application 126 identifies context via camera 133, sensors 132, and data store 134. Context can include one or more images, identified hand gestures, eye gaze data, body pose/posture, device location, recent and current activity, social situation, a relevant object that may be visible in the background or nearby, non-speech background audio, speech affect (emotional/attitude context of the speech), as well as any relevant personal preferences that may be accessible to the device. In some implementations, the context can be derived from a series of images or video. For example, when the user uses an ambiguous term, such as "it" or "those," the search application 126 can use the context to determine what is referenced by the user. The system can use imaging provided by camera 133 to determine any objects or text present in the user's view, use conversation history to determine the object referenced by the user, or use some other context information. In some examples, search application 126 can perform image-to-text recognition, identify text in the image, or perform some other processing on the image to determine the context of the image.

In some implementations, in processing the query 160, search application 126 can use noun-phrase extraction to identify the entity. Noun phrase extraction is a natural language processing technique that identifies entities by extracting noun-centered phrases, helping isolate important subjects, objects, or concepts in the query. In other implementations, search application 126 can use LLMs to identify the entity or entities of interest in the query. LLMs identify entities in natural language by analyzing context and patterns within the text, using pre-trained knowledge to recognize and categorize names, places, organizations, and other significant terms as entities. Once the terms are identified, search application 126 can identify context associated with the objects. For example, if the user referenced "a book," the device can use images gathered from camera 133 to identify the book's title or some other information about the book. The context can include any information from sensors 132 and camera 133 and can further include information stored in data store 134. Data store 134 can store a user profile, conversation histories, captured images from camera 133, or some other historical information to provide context to the user query 160. The user profile can indicate at least one preference associated with the user (e.g., color preference, brand preference) or attribute associated with the user (e.g., location of the user).

In addition to identifying the context, search application 126 generates at least one search from the query and the context. In some implementations, the search comprises a web search, which includes terms from the query and the context. For example, if the user references a "red dog" in the query, search application 126 can identify the red dog in an image captured by XR device 130 using object recognition. Search application 126 can then generate a query that returns information about the red dog using a reverse image search. This can help identify objects, places, or people in the picture, find similar images, or provide some other information about the image. The search service can use specialized tools to perform these searches by analyzing visual elements in the image, such as colors, shapes, and patterns, to provide relevant search results. In some implementations, search application 126 obtains at least a text descriptor associated with an object captured in the image (e.g., from a web search). In some implementations, search application 126 identifies text captured in the images (e.g., words on a poster). In addition to or in place of the image search, search application 126 can further support searches using information from the query, audio, sensor data (e.g., location), or some other information using the context. In some implementations, the search can be generated using a language model to combine information from the query and the context (e.g., information derived from a reverse image search or image-to-text).

Search application 126 further processes one or more search results from one or more searches to generate a response and provide the response as an update on display 131. In some implementations, search application 126 can generate a response using a language model. The language model can process and synthesize the search results into a coherent response that addresses the user's query. In some examples, the LLM can be configured to generate multiple candidate responses, and the responses are scored to select the response provided to user 110.

As an example, from computing environment 100, user 110 can generate query 160 asking for the actress's name on poster 175. Search application 126 can perform speech-to-text on the query and identify context information using the camera, sensors, or data store. From the context (e.g., identifying the poster and the image on the poster), search application 126 can perform a search to obtain results for the query. From the results, search application 126 can generate a response that is provided to the user (e.g., provide in a coherent response from an LLM). In some examples, search application 126 can rank and select a response from a list of candidate responses for the user and display the response for the user.

FIG. 2 illustrates method 200 of operating a wearable device to support multimodal search according to an implementation. The steps of method 200 are referenced parenthetically in the paragraphs that follow with reference to systems and elements of computing environment 100 of FIG. 1.

Method 200 includes obtaining (201), at a wearable device, a query and identifying (202) context associated with the query, the context including at least a set of one or more images captured by the wearable device. In some implementations, the device can consider additional contextual information. The contextual information can include identified hand gestures, eye gaze, body pose/posture, device location, recent and current activity, social situation, a relevant object that may be visible in the background or nearby, non-speech background audio, speech affect (emotional/attitude context of the speech), as well as any relevant personal preferences that may be accessible to the device. The information can be gathered via various sensors and data stored on the device. In some implementations, the device can process the natural language from the query to determine the potential context required to support the query. For example, the user can generate a request to identify the ingredients from a food item. The method can process the language to determine that an image (or images) is required to identify the food item and can obtain the image from the camera on the device. In some examples, the object can be identified via object recognition (e.g., identifying the food item in the image). In some examples, when multiple objects are present in the image, the device can reference the user's gesture or eye gaze to determine which food objects are referenced. Although demonstrated as identifying one or more images associated with the context, the device can use other sensors and sensor data on the device to provide context for the query. These sensors can provide information about audio for the user, the motion of the user, the location of the user, the activity of the user, or some other information.

Method 200 further includes generating (203) at least one search from the query and the context and obtaining at least one search result from the at least one search. Referring to an example from FIG. 1, user 110 can generate query 160 requesting the actress's name in poster 175. In response to the query, XR device 130 processes the language to determine context required to respond to the query. Specifically, the context required is one or more images from the device to identify the actress in the poster. The device can further use gesture recognition to select the appropriate poster based on gesture 142 pointing at the poster. Once the image and the actress are identified using object recognition in the poster, one or more requests (e.g., web search requests) can be initiated to determine the actress's name.

Method 200 also includes generating (204) or determining candidate responses to the query based on the at least one result. Method 200 further includes selecting (205) a response from the candidate responses and providing the response to a user of the wearable device. In some implementations, the response is provided via the display on the device. In some implementations, the response is provided via a speaker for the device user. In some examples, responses are generated using an LLM through a process where the model analyzes the input query, then predicts and constructs the most likely sequence of words that follow based on training data. The LLM can use neural networks, typically with transformer architecture, to understand context, meaning, and intent within the query. Sampling can generate multiple potential responses by predicting various plausible word sequences. Techniques like beam search, top-k sampling, and nucleus sampling can produce a diverse set of candidate responses. These candidates can then be ranked or filtered based on relevance or other criteria to present the most appropriate response to the user. For example, when the user provides the query to name the actress in poster 175, the method can generate a plurality of potential responses. The potential responses are then scored based on relevance, length, and the like to select the response that is most relevant for the user (e.g., providing the actress's name using a reverse image search).

Figure 3:
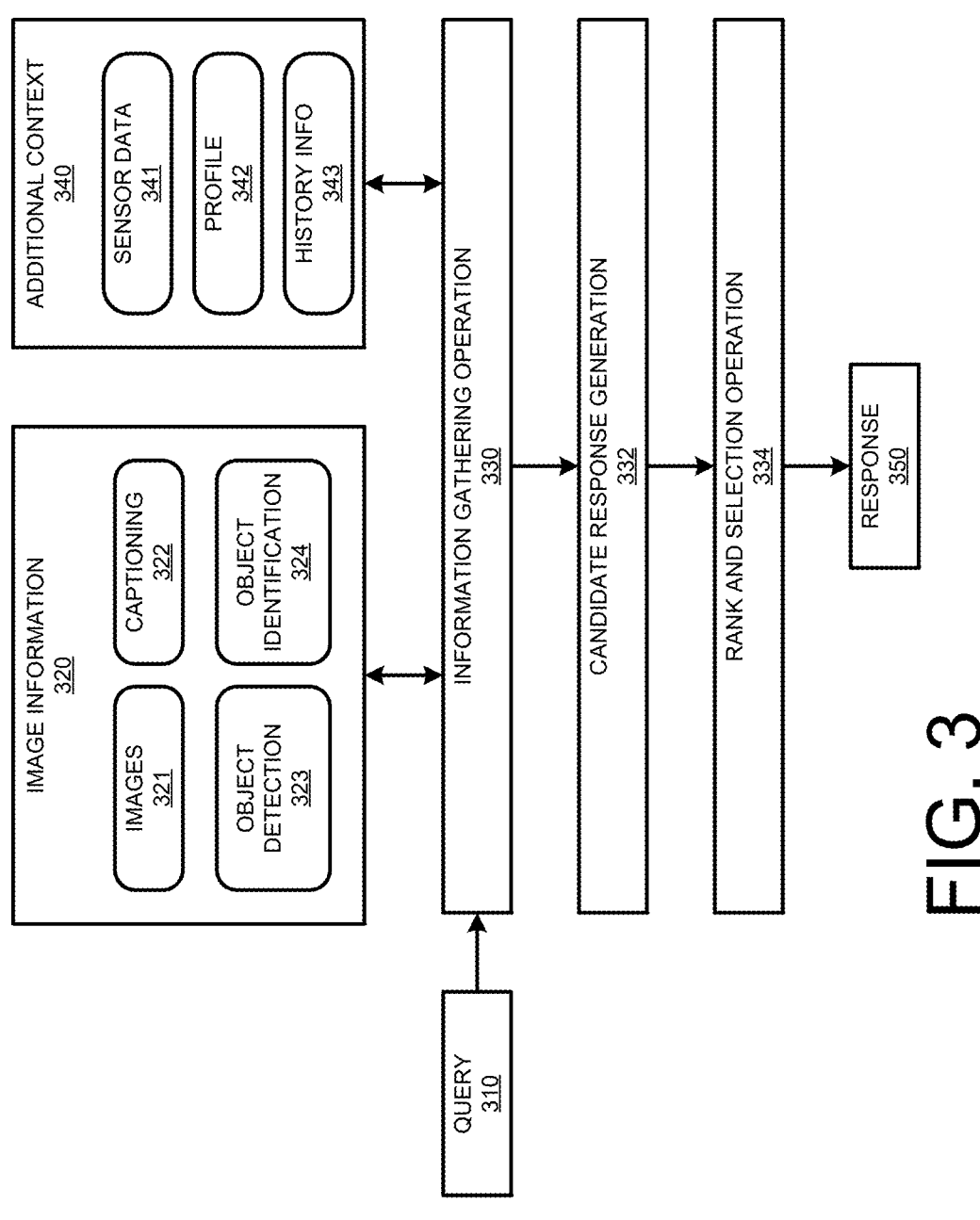
FIG. 3 illustrates a flow diagram demonstrating multimodal search on a wearable device according to an implementation.

FIG. 3 illustrates a flow diagram 300 demonstrating multimodal search on a wearable device according to an implementation. Flow diagram 300 includes query 310, image information 320, additional context 340, information gathering operation 330, candidate response generation 332, rank and selection operation 334, and response 350. Image information 320 further includes images 321, captioning 322, object detection 323, and object identification 324. Additional context 340 further includes sensor data 341, profile 342, and history information (info) 343. Flow diagram 300 represents an operation that can be performed by a wearable device, such as an XR device, in some examples. In some implementations, at least a portion of the operations from flow diagram 300 can be performed by a secondary device, such as a server or external computer from the wearable device.

In flow diagram 300, information gathering operation 330 identifies query 310 and obtains context relevant to query 310. The relevant context can include image information 320 and additional context 340. Image information 320 can include the images 321 captured from one or more cameras on the device (e.g., outward-facing cameras that match the perspective of the user), captioning 322 associated with the images (e.g., identify text captured in the images), object detection 323 to identify one or more objects in the images, and object identification 324 that identifies information about the objects in the image or a text descriptor for objects identified in the image (e.g., reverse image search). In some implementations, the device can use the images to identify objects in the user's environment and gestures provided by the user to identify an object referenced by the user. In some examples, the device can use a set of images or video to identify the object referenced by the user. For example, the user can use a pointing gesture provided by the user to identify the object referenced in the query.

In some implementations, in addition to or in place of using the imaging information, the system can further use additional context 340. Additional context 340 includes sensor data 341, profile 342, and history information (info) 343. Sensor data 341 can include position, orientation, and movement data from accelerometers, gyroscopes, and magnetometers to track the user's location and interactions within a virtual or augmented environment. Sensor data 341 can also include data depth sensors or LiDAR to map surroundings and interpret gestures, facial expressions, or eye movements in conjunction with the camera data. In some examples, sensor data 341 can include eye gaze data, which can employ infrared cameras and sensors. These devices illuminate the eyes with infrared light and capture reflections from the cornea and retina to calculate the direction of the user's gaze. Profile 342 includes attributes about the user, such as personal preferences (e.g., response length, search preferences, and the like). History information 343 can consist of conversational history associated with one or more query sequences. For example, with user permission, the device can maintain a conversation log that includes prompts or queries from the user and responses from the device. The conversation log can provide context for an ongoing session on the device where the device provides multiple responses to queries from the user.

In some implementations, for profile 342, history information 343, and other information stored about the user, the user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, specific data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user and how that information is used to provide the context and multimodal query responses described herein.

Based on the query and the context, information gathering operation 330 can generate one or more search requests (e.g., web searches) and obtain results associated with the query. For example, a wearable device can identify an object (e.g., poster) in a set of images from the device. The wearable device can generate a web search for a reverse image search to identify the information in the poster. The wearable device can also generate supplemental requests based on the information provided from the reverse image search. Thus, if the first search provided an actress's name, a second search can obtain additional information about the actress, such as movies associated with the actress, age, and the like.

Once the results are obtained for the one or more searches, candidate response generation 332 generates candidate responses based on the results and the query and rank and selection operation 334 ranks and selects a response from the candidates. In some implementations, the system summarizes or rephrases the results using an LLM, which processes the extracted text to produce coherent and contextually relevant responses. After generating candidate responses, the device evaluates them based on factors, such as relevance, coherence, and factual accuracy. This ranking process can involve scoring each response using algorithms or models trained to assess linguistic quality, alignment with the query intent, and similarity to trusted sources. Additional criteria, like diversity of perspectives or user preference history, may also contribute to the ranking. Response 350 is selected and provided to the device user from the ranking. In some examples, the device can display response 350. In some examples, the device can generate audio of response 350.

Figure 4A:
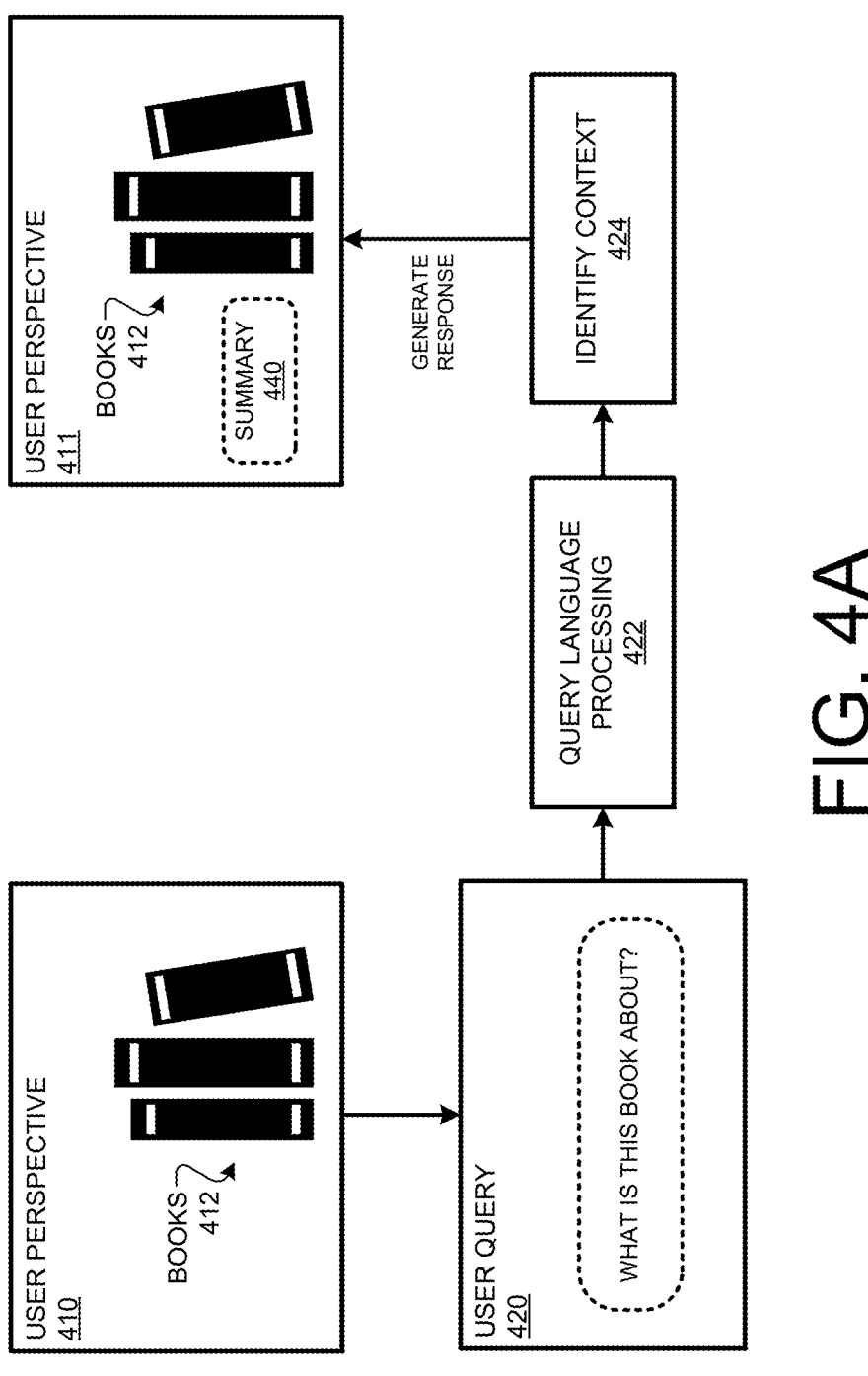
FIG. 4A illustrates an operational scenario of processing a user query using context according to an implementation.

FIG. 4A illustrates an operational scenario 400 of processing a user query using context according to an implementation. Operational scenario 400 includes user perspective 410 with books 412, user query 420, query language processing 422, identify context 424, and user perspective 411 with summary 440. User perspectives 410-411 represent the user perspective or view from an XR device while the device performs the operations. In some implementations, at least a portion of the operations can be performed by a secondary device (or devices), such as a server.

In operational scenario 400, a user generates user query 420 that provides, "What is this book about?" User query 420 can be provided via a microphone, via a keyboard, or via some other input operation. In response to identifying user query 420, the device performs query language processing 422, which processes the language of the query. In some examples, the device can use noun-phrase extraction to identify the entity or entities associated with the request. Noun phrase extraction is a natural language processing technique that identifies entities by extracting noun-centered phrases, helping isolate important subjects, objects, or concepts in text. In other implementations, the system can use an LLM to identify the entity or entities of interest in the query. LLMs identify entities in natural language by analyzing context and patterns within the text, using pre-trained knowledge to recognize and categorize names, places, organizations, and other significant terms as entities. Here, the device can identify the term book as the entity of interest within the query.

After processing the language of the query, the device can identify context 424 associated with the query. The context can comprise sensor information or data from a data store associated with the device. In some examples, the context includes one or more images relevant to the query. In some examples, the context can include position, orientation, and movement from accelerometers, gyroscopes, and magnetometers to track the user's location and interactions within an environment. The sensor data can also include information related to gestures provided by the user. In some examples, the context consists of information from a data store, where the data store can include attributes from a user profile (preferences, saved information about the user, etc.), can consist of conversation history, can include stored images, or can include some other information. In some implementations, the data store is local to the wearable device. In some implementations, the data store is stored separately from the wearable device (e.g., as a cloud service or remote server). In some implementations, the data store can be stored on a combination of the wearable device and one or more external devices. In operational scenario 400, a system can identify a first book from books 412 referenced by the user based on the user gaze or gesture in some examples. Where the referenced book corresponds to the intersection of the user's gaze or the intersection of the user's gesture to the gaze.

From the context, one or more searches (e.g., web searches can be implemented) to retrieve one or more results. Results can include links, portions of content, text, or some other information associated with the searched query. From the search results, operational scenario 400 further includes generating a response, where the response is demonstrated in user perspective 411 as summary 440. In some implementations, the device can be configured to use an LLM to generate the response. The model can be configured to process the results of the one or more searches to evaluate for relevance, credibility, and/or depth. The model can filter the information from the results to determine relevant points or information related to the query and generate a coherent response. In some examples, the system can sample multiple potential outputs from the LLM by adjusting parameters like temperature (for diversity) and decoding methods (like top-k or nucleus sampling). Each candidate is then produced by repeatedly prompting the model, allowing for variations in phrasing, detail, and approach, creating a range of responses that can be evaluated and ranked. In some examples, candidate responses are scored based on relevance (to the query), accuracy, coherence, completeness, and/or tone. The ranking process can assign scores to each candidate, allowing for a prioritized list, with the highest-ranking response selected to be provided to the user as summary 440. Although demonstrated as providing summary 440 as a displayed response, other systems can provide the response using a speaker associated with the wearable device.

Figure 4B:
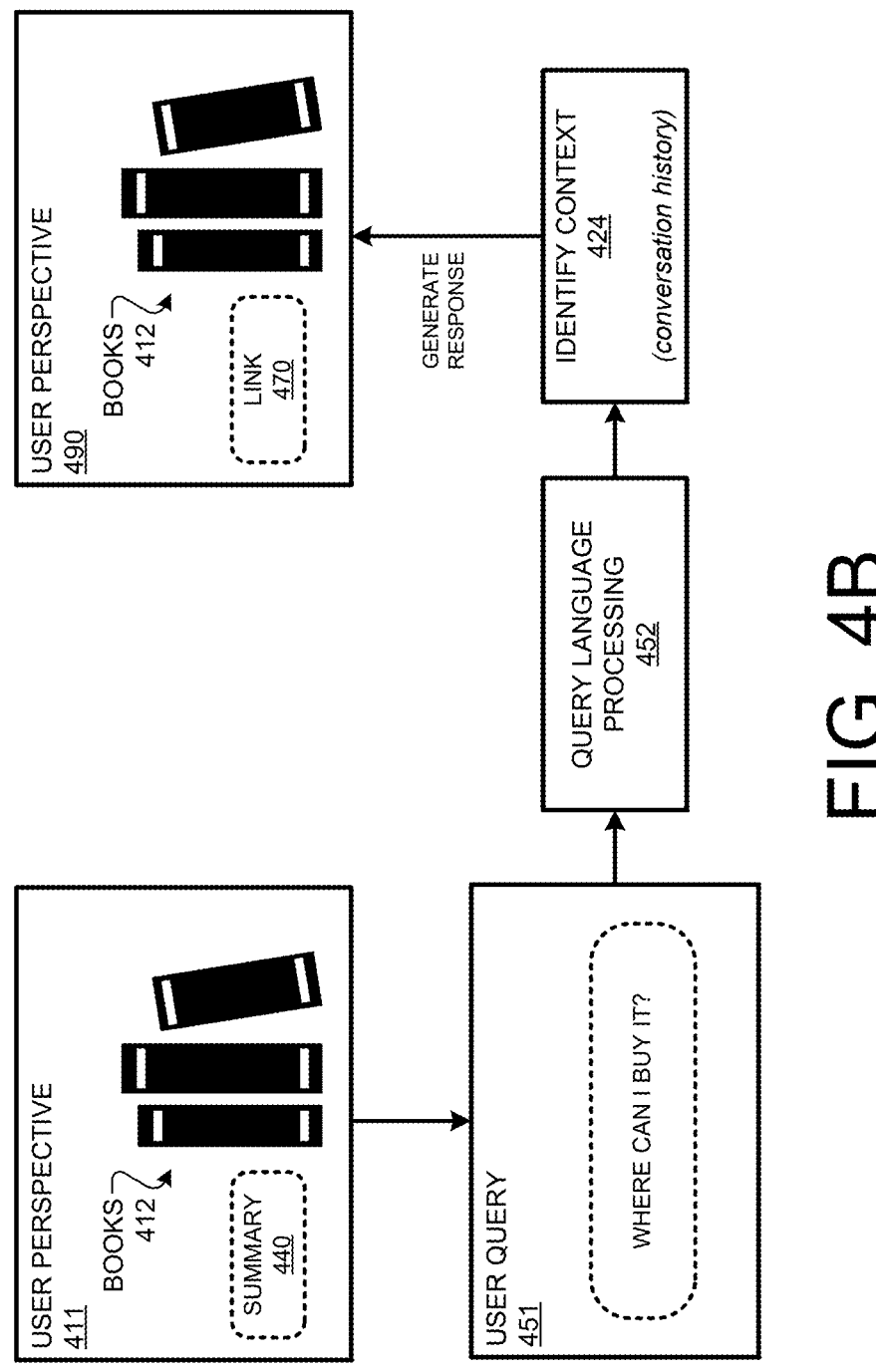
FIG. 4B illustrates an operational scenario of processing a user query using context according to an implementation.

FIG. 4B illustrates an operational scenario 450 of processing a user query using context according to an implementation. Operational scenario 450 is a continuation of operational scenario 400 of FIG. 4A. Operational scenario 450 includes user perspective 411 with books 412 and summary 440, user query 451, query language processing 452, identify context 424, and user perspective 490 with books 412.

In operational scenario 450, a user generates user query 451 after user query 420, where the query provides, "Where can I buy it?" In response to the query, the system can initiate query language processing 452, which processes the natural language of the request. Here, the natural language processing can determine that the ambiguous term "it" requires additional context to respond to the query. Identify context 424 obtains or identifies the context to assist in identifying the unclear term. The context can comprise sensor information or data from a data store associated with the device. In some examples, the context includes one or more images relevant to the query. In some examples, the context can include position, orientation, and movement from accelerometers, gyroscopes, and magnetometers to track the user's location and interactions within an environment. The sensor data can also include information related to gestures provided by the user. In some examples, the context consists of information from a data store, where the data store can include attributes from a user profile (preferences, saved information about the user, etc.), can consist of conversation history, can include stored images, or can include some other information. In some implementations, the data store is local to the wearable device. In some implementations, the data store is stored separately from the wearable device (e.g., as a cloud service or remote server). In some implementations, the data store can be stored on a combination of the wearable device and one or more external devices. In operational scenario 450, identify context 424 identifies potential references to the object using conversation history. Specifically, identify context 424 can identify the book from the previous query on the wearable device. In some examples, identify context 424 can select the book based on the recent query relating to a specific book title.

The identified context is then used to generate user perspective 490 with link 470 to the potential sales point for the book. In some implementations, when the book is identified through the context, the system can also identify preferences associated with purchasing the book. The system can query the website or service associated with the preference and determine the link related to the requested item. Once the link is identified, it can be provided as a response.

In some implementations, the system can sample multiple potential outputs from the LLM by adjusting parameters like temperature (for diversity) and decoding methods (like top-k or nucleus sampling). Each candidate is then produced by repeatedly prompting the model, allowing for phrasing, detail, and approach variations, creating a range of responses that can be evaluated and ranked. In some examples, candidate responses are scored based on relevance (to the query), accuracy, coherence, completeness, and/or tone. The ranking process can assign scores to each candidate, allowing for a prioritized list, with the highest-ranking response selected to be provided to the user as link 470 (with potential additional text). Although demonstrated as providing the link as a displayed response, other systems can provide the response using a speaker associated with the wearable device. Different LLMs can also be used in some examples to generate different responses. The different LLMs can be local to the wearable device or be located on other systems (servers, desktop computers, and the like) from the wearable device.

In some implementations, the user can prompt the device to store information as part of a user profile or data store. For example, the user can generate a request to "store this as my favorite shoe." In response to the request, the device can use context identified from cameras and/or sensors to identify the shoe using a web search (e.g., reverse image search) and store the shoe name within the user's profile.

Figure 5:
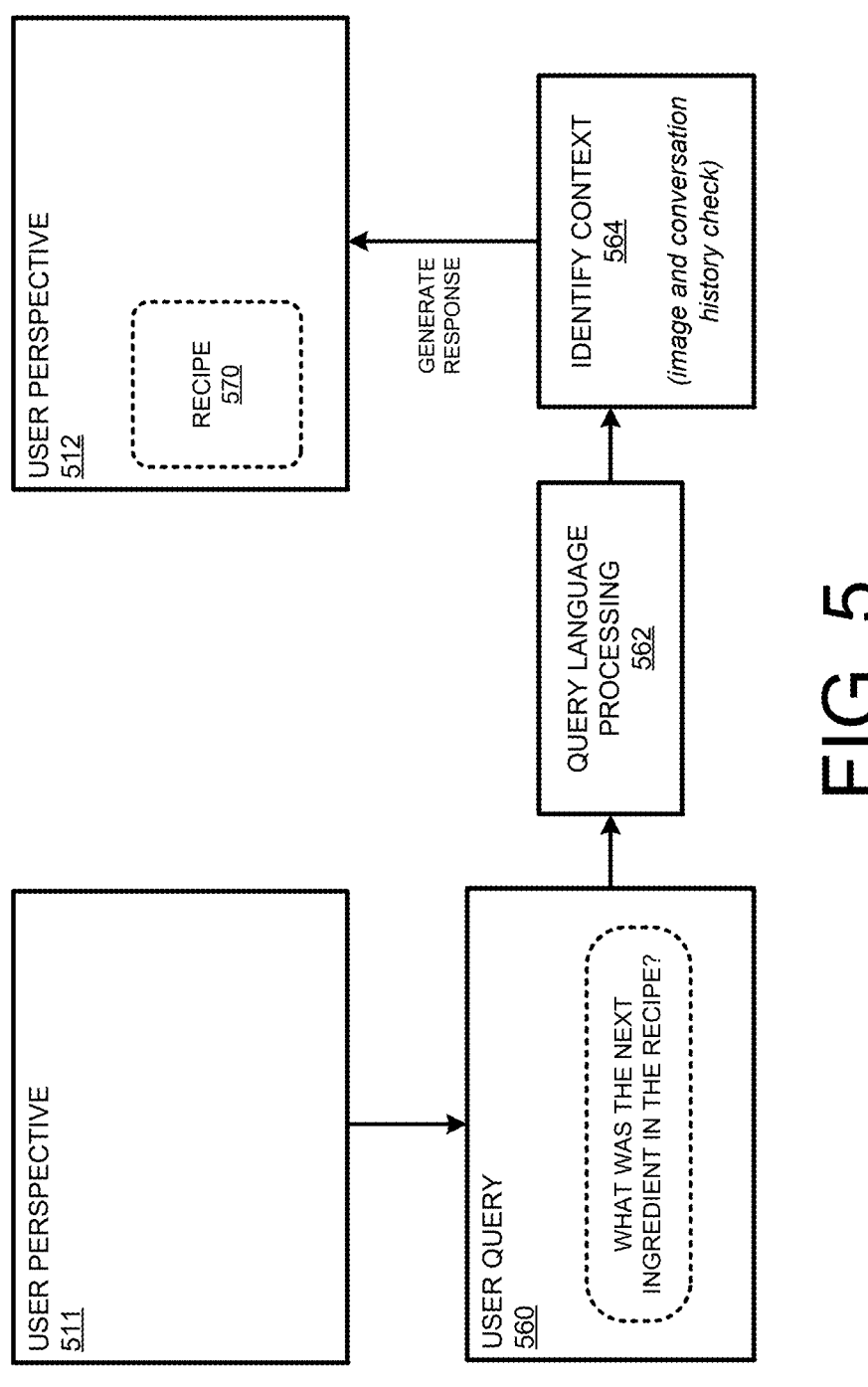
FIG. 5 illustrates an operational scenario of processing a user query using context according to an implementation.

FIG. 5 illustrates an operational scenario 500 of processing a user query using context according to an implementation. Operational scenario 500 includes user perspective 511 user query 560, query language processing 562, identify context 564, and user perspective 512 with recipe 570. In some examples, the steps of operational scenario 500 can be performed by an XR device or some other wearable device. In some examples, the steps of operational scenario 500 can be performed by multiple devices, such as a wearable device and one or more remote computing devices (e.g., servers).

In operational scenario 500, a user generates user query 560, which provides, "What is the next ingredient in the recipe?" In some implementations, user query 560 is received via one or more microphones on the wearable device and are transformed to text using voice-to-text. In some implementations, user query 560 is received via a keyboard, gesture, or another input mechanism. In response to receiving the query, operational scenario 500 performs query language processing 562 to identify context 564 associated with the query. Here, the device can process the language to determine the subjects or entities related to the query can include the next ingredient and the recipe. In response to processing the language of the query, identify context 564 is used to identify context associated with the entities identified in the query (e.g., the ambiguous or unknown terms).

The context can comprise sensor information or data from a data store associated with the device. In some examples, the context includes one or more images relevant to the query. In some examples, the context can include position, orientation, and movement from accelerometers, gyroscopes, and magnetometers to track the user's location and interactions within an environment. The sensor data can also include information related to gestures provided by the user. In some examples, the context consists of information from a data store, where the data store can include attributes from a user profile (preferences, saved information about the user, etc.), can consist of conversation history, can include stored images, or can include some other information. In some implementations, the data store is local to the wearable device. In some implementations, the data store is stored separately from the wearable device (e.g., as a cloud service or remote server). In some implementations, the data store can be stored on a combination of the wearable device and one or more external devices. In operational scenario 500, imaging or conversation history can be checked to identify the recipe. For example, if the user recently requested and received a recipe on the device, the recipe can be retrieved and displayed in user perspective 512. The recipe can be provided as an image or can be included as part of a natural language response in some examples. In some implementations, the device can retrieve one or more images captured by the device (e.g., outward-facing images) and identify an image that includes a recipe (e.g., text extracted) from the image. The text can then be provided to the user as recipe 570. In some examples, the text can be updated using natural language and LLM to give the user the response. Although demonstrated as part of user perspective 512, the response (i.e., recipe 570) can be provided via one or more speakers on the wearable device in some examples.

Figure 6:
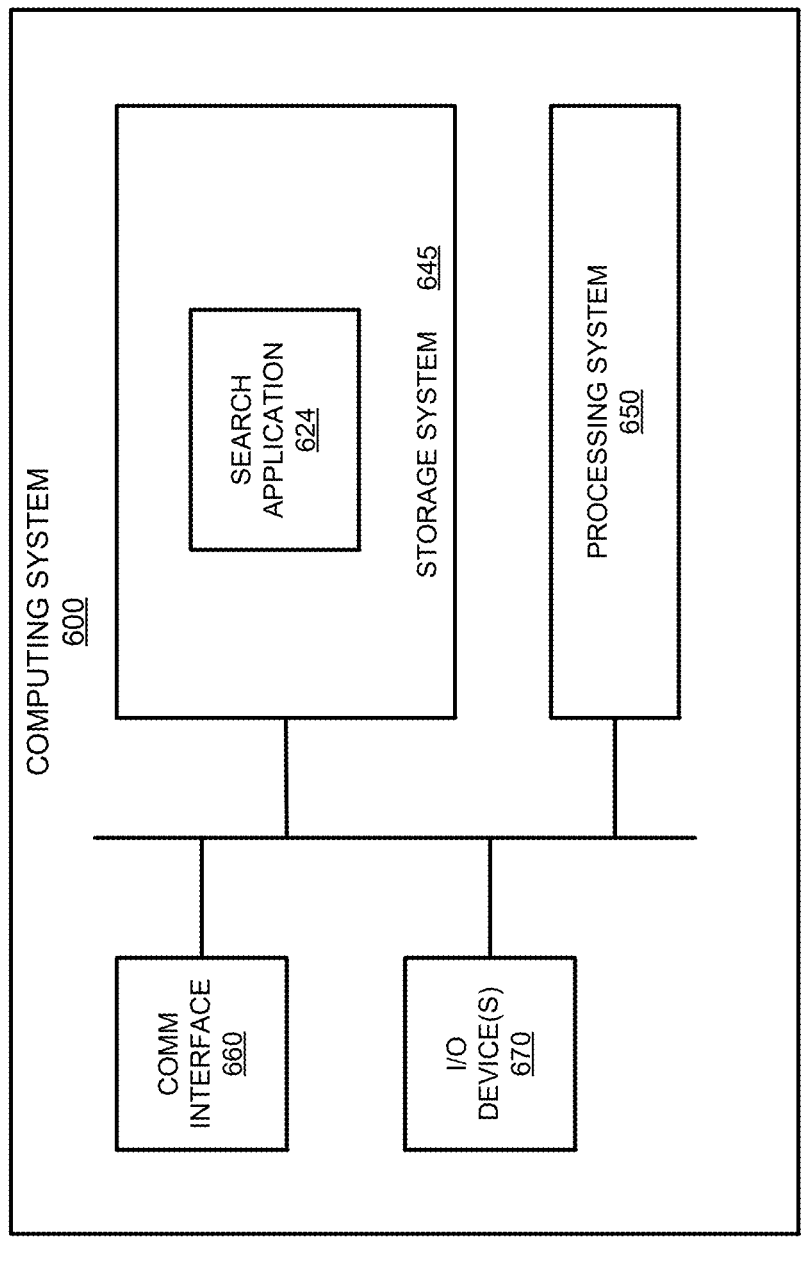
FIG. 6 illustrates a computing system capable of multimodal search according to an implementation.

FIG. 6 illustrates a computing system 600 capable of multimodal search according to an implementation. Computing system 600 is representative of any computing system or systems with which the various operational architectures, processes, scenarios, and sequences disclosed herein for responding to queries on a wearable device can be implemented. Computing system 600 is representative of XR device 130 in some examples. Computing system 600 can represent a combination of a wearable device and one or more servers or back-end devices to support the LLM operations described herein. Computing system 600 includes storage system 645, processing system 650, communication interface 660, and input/output (I/O) device(s) 670. Processing system 650 is operatively linked to communication interface 660, I/O device(s) 670, and storage system 645. In some implementations, communication interface 660 and/or I/O device(s) 670 may be communicatively linked to storage system 645. Computing system 600 may further include other components, such as a battery and enclosure, that are not shown for clarity.

Communication interface 660 comprises components that communicate over communication links, such as network cards, ports, radio frequency, processing circuitry (and corresponding software), or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format-including combinations thereof. Communication interface 660 may be configured to communicate with external devices, such as servers, user devices, or other computing devices.

I/O device(s) 670 may include peripherals of a computer that facilitate the interaction between the user and computing system 600. Examples of I/O device(s) 670 may include keyboards, mice, trackpads, monitors, displays, printers, cameras, microphones, external storage devices, sensors, and the like.

Processing system 650 comprises microprocessor circuitry (e.g., at least one processor) and other circuitry that retrieves and executes operating software (i.e., program instructions) from storage system 645. Storage system 645 may include volatile and nonvolatile, removable, and non-removable media implemented in any method or technology for storage of information, such as computer-readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media (also referred to as computer-readable storage media) include random access memory, read-only memory, magnetic disks, optical disks, and flash memory, as well as any combination or variation thereof, or any other type of storage media. In some implementations, the storage media may be non-transitory. In some instances, at least a portion of the storage media may be transitory. In no case is the storage media a propagated signal.

Processing system 650 is typically mounted on a circuit board that may hold the storage system. The operating software of storage system 645 comprises computer programs, firmware, or some other form of machine-readable program instructions. The operating software of storage system 645 comprises search application 624. The operating software on storage system 645 may further include an operating system, utilities, drivers, network interfaces, applications, or some other type of software. When read and executed by processing system 650 the operating software on storage system 645 directs computing system 600 to operate as a computing device as described herein. In at least one implementation, the operating software can provide method 200, described in FIG. 2, to determine a response to a user query.

In at least one implementation, search application 624 directs processing system 650 to obtain a query and identify context associated with the query, the context comprising a set of images captured by the wearable device. In some implementations, search application 624 can process the text (e.g., voice-to-text) to identify references to ambiguous entities. After identifying the ambiguous entities, search application 624 can identify sensor data or stored information that can assist in identifying the ambiguous entity. In some examples, the context includes one or more images relevant to the query. In some examples, at least a portion of the images are captured before the query. The images can be used to identify gestures or entities referenced by the user. In some examples, the context can include position, orientation, and movement from accelerometers, gyroscopes, and magnetometers to track the user's location and interactions within an environment. The sensor data can also include information related to gestures provided by the user. In some examples, the context consists of information from a data store, where the data store can include attributes from a user profile (preferences, saved information about the user, etc.), can consist of conversation history, can include stored images, or can include some other information. In some implementations, the data store is local to the wearable device. In some implementations, the data store is stored separately from the wearable device (e.g., as a cloud service or remote server). In some implementations, the data store can be stored on a combination of the wearable device and one or more external devices.

In addition to identifying the context, search application 624 further directs processing system 650 to generate at least one search (e.g., web search) from the query and the context and obtain at least one result to the at least one search. In some examples, search application 624 can use a LLM to generate the query. The LLM can be local to the device or can be applied external to the device in some examples. In some implementations, to generate the query, the one or more images can be processed to identify text in the images, identify entities in the images (image-to-text processing), identify gestures from the user, or identify some other information to incorporate into the query.

With the results from the at least one search, search application 624 determines a response to the query using the query and the results and provides the response to a user of the wearable device. In some implementations, the response is generated using an LLM that processes the information from the responses and the query to generate a coherent response. In some implementations, the search application can use a rank and selection operation to determine the response for the query. For example, the search application can sample multiple potential outputs from the LLM by adjusting parameters like temperature (for diversity) and decoding methods (like top-k or nucleus sampling). Each candidate is then produced by repeatedly prompting the model, allowing for phrasing, detail, and approach variations, creating a range of responses that can be evaluated and ranked. In some examples, candidate responses are scored based on relevance (to the query), accuracy, coherence, completeness, and/or tone. The ranking process can assign scores to each candidate, allowing for a prioritized list, with the highest-ranking response selected as the final answer or response.

Clause 1. A method comprising: obtaining, at a wearable device, a query; identifying context associated with the query, the context comprising a set of images captured by the wearable device; generating at least one search from the query and the context; obtaining at least one result for the at least one search; determining a response to the query based on the at least one result; and providing the response to a user of the wearable device.

Clause 2. The method of clause 1, wherein generating the at least one search from the query and the context comprises: processing the set of images captured by the wearable device to identify a text descriptor associated with an object in the set of images; and generating the at least one search from the query and the text descriptor.

Clause 3. The method of clause 1, wherein the set of images comprises a first image captured at a first time and a second image captured at a second time.

Clause 4. The method of clause 3, wherein the first time is before obtaining the query, and wherein the second time is in response to obtaining the query.

Clause 5. The method of clause 1, wherein the context comprises a history associated with input provided by the user to the wearable device before obtaining the query.

Clause 6. The method of clause 1, wherein the context comprises a user profile, the user profile indicating at least one preference associated with the user or at least one attribute associated with the user.

Clause 7. The method of clause 1, wherein identifying the context comprises obtaining the context from at least one sensor on the wearable device, and wherein the context comprises movement data for the wearable device, location data for the wearable device, or eye gaze data associated with the user.

Clause 8. The method of clause 1, wherein determining the response to the query based on the at least one result comprises: determining a set of candidate responses to the query based on the at least one result and a language model; and selecting the response from the set of candidate responses based on a relevance to the query.

Clause 9. A computing apparatus comprising: a non-transitory computer-readable storage medium; at least one processor operatively coupled to the non-transitory computer-readable storage medium; and program instructions stored on the non-transitory computer-readable storage medium that, when executed by the at least one processor, direct the computing apparatus to perform a method, the method comprising: obtaining, at a wearable device, a query; identifying context associated with the query, the context comprising a set of images captured by the wearable device; generating at least one search from the query and the context; obtaining at least one result for the at least one search; determining a response to the query based on the at least one result; and providing the response to a user of the wearable device.

Clause 10. The computing apparatus of clause 9, wherein generating the at least one search from the query and the context comprises: processing the set of images captured by the wearable device to identify text captured in the set of images; and generating the at least one search from the query and the text.

Clause 11. The computing apparatus of clause 9, wherein the set of images comprises a first image captured at a first time and a second image captured at a second time.

Clause 12. The computing apparatus of clause 11, wherein the first time is before obtaining the query, and wherein the second time is in response to obtaining the query.

Clause 13. The computing apparatus of clause 9, wherein the context comprises a history associated with input provided by the user to the wearable device before obtaining the query.

Clause 14. The computing apparatus of clause 9, wherein the context comprises a user profile, the user profile indicating at least one preference associated with the user or at least one attribute associated with the user.

Clause 15. The computing apparatus of clause 9, wherein identifying the context comprises obtaining the context from at least one sensor on the wearable device, and wherein the context comprises movement data for the wearable device, location data for the wearable device, or eye gaze data associated with the user.

Clause 16. The computing apparatus of clause 9, wherein determining the response to the query based on the at least one result comprises: determining a set of candidate responses to the query based on the at least one result and a language model; and selecting the response from the set of candidate responses based on a relevance to the query.

Clause 17. A non-transitory computer-readable storage medium having program instructions stored there on that, when executed by at least one processor, direct the at least one processor to perform a method, the method comprising: obtaining, at a wearable device, a query; identifying context associated with the query, the context comprising at least one image captured by the wearable device; generating at least one search from the query and the context; obtaining at least one result for the at least one search; determining a response to the query based on the at least one result; and providing the response to a user of the wearable device.

Clause 18. The non-transitory computer-readable storage medium of clause 17, wherein generating the at least one search from the query and the context comprises: processing the at least one image captured by the wearable device to identify a text descriptor associated with an object in the at least one image; and generating the at least one search from the query and the text descriptor.

Clause 19. The non-transitory computer-readable storage medium of clause 17, wherein the context comprises a history associated with input provided by the user to the wearable device before obtaining the query.

Clause 20. The non-transitory computer-readable storage medium of clause 19, wherein the context comprises a user profile, the user profile indicating at least one preference associated with the user or at least one attribute associated with the user.

In this specification and the appended claims, the singular forms "a," "an" and "the" do not exclude the plural reference unless the context dictates otherwise. Further, conjunctions such as "and," "or," and "and/or" are inclusive unless the context dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections, or logical connections may be present in a practical device. Moreover, no item or component is essential to the practice of the implementations disclosed herein unless the element is specifically described as "essential" or "critical."

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, the use of terms such as up, down, top, bottom, side, end, front, back, etc. herein are used concerning a currently considered or illustrated orientation. If they are considered concerning another orientation, such terms must be correspondingly modified.

Further, in this specification and the appended claims, the singular forms "a," "an" and "the" do not exclude the plural reference unless the context dictates otherwise. Moreover, conjunctions such as "and," "or," and "and/or" are inclusive unless the context dictates otherwise. For example, "A and/or B" includes A alone, B alone, and A with B.

Although certain example methods, apparatuses, and articles of manufacture have been described herein, the scope of coverage of this patent is not limited thereto. It is to be understood that the terminology employed herein is to describe aspects and is not intended to be limiting. On the contrary, this patent covers all methods, apparatus, and articles of manufacture fairly falling within the scope of the claims of this patent.

What is claimed is:

1. A method comprising:
obtaining, at a device, a query from a user of the device;
identifying context associated with the query, the context comprising a set of images captured by a camera on the device, wherein the camera is positioned to capture a physical environment associated with a perspective of the user;
generating at least one search from the query and the context, wherein generating the at least one search from the query and the context comprises:
processing the set of images to identify an object referenced in association with the query; and
generating the at least one search based on the query, the context, and the object;
obtaining at least one result for the at least one search;
determining a response to the query based on the at least one result; and
providing the response to the user of the device.

2. The method of claim 1, wherein generating the at least one search from the query and the context comprises:
processing the set of images to identify a text descriptor associated with the object in the set of images; and
generating the at least one search based on the query, the context, the object, and the text descriptor.

3. The method of claim 1, wherein the set of images comprises a first image captured at a first time and a second image captured at a second time.

4. The method of claim 3, wherein the first time is before obtaining the query, and wherein the second time is in response to obtaining the query.

5. The method of claim 1, wherein the context comprises a history associated with input provided by the user to the device before obtaining the query.

6. The method of claim 1, wherein the context comprises a user profile, the user profile indicating at least one preference associated with the user or at least one attribute associated with the user.

7. The method of claim 1, wherein identifying the context comprises obtaining the context from at least one sensor on the device, and wherein the context comprises movement data for the device, location data for the device, or eye gaze data associated with the user.

8. The method of claim 1, wherein processing the set of images to identify the object referenced in the query comprises:
identifying a gesture from the user in the set of images; and
selecting the object in the set of images based on the gesture.

9. A computing apparatus comprising:
a non-transitory computer-readable storage medium;
at least one processor operatively coupled to the non-transitory computer-readable storage medium; and
program instructions stored on the non-transitory computer-readable storage medium that, when executed by the at least one processor, direct the computing apparatus to perform a method, the method comprising:
obtaining, at a device, a query from a user of the device;
identifying context associated with the query, the context comprising a set of images captured by a camera on the device, wherein the camera is positioned to capture a physical environment associated with a perspective of the user;
generating at least one search from the query and the context, wherein generating the at least one search from the query and the context comprises:
processing the set of images to identify an object referenced in association with the query; and
generating the at least one search based on the query, the context, and the object;
obtaining at least one result for the at least one search;
determining a response to the query based on the at least one result; and
providing the response to the user of the device.

10. The computing apparatus of claim 9, wherein generating the at least one search from the query and the context comprises:
processing the set of images captured by the device to identify text captured in the set of images; and
generating the at least one search based on the query, the context, and the text.

11. The computing apparatus of claim 9, wherein the set of images comprises a first image captured at a first time and a second image captured at a second time.

12. The computing apparatus of claim 11, wherein the first time is before obtaining the query, and wherein the second time is in response to obtaining the query.

13. The computing apparatus of claim 9, wherein the context comprises a history associated with input provided by the user to the device before obtaining the query.

14. The computing apparatus of claim 9, wherein the context comprises a user profile, the user profile indicating at least one preference associated with the user or at least one attribute associated with the user.

15. The computing apparatus of claim 9, wherein identifying the context comprises obtaining the context from at least one sensor on the device, and wherein the context comprises movement data for the device, location data for the device, or eye gaze data associated with the user.

16. The computing apparatus of claim 9, wherein processing the set of images to identify the object referenced in the query comprises:
identifying a gaze associated with the user; and
selecting the object in the set of images based on the gaze.

17. A non-transitory computer-readable storage medium having program instructions stored there on that, when executed by at least one processor, direct the at least one processor to perform a method, the method comprising:

obtaining, at a device, a query from a user of the device;

identifying context associated with the query, the context comprising at least one image captured by a camera on the device, wherein the camera is positioned to capture a physical environment associated with a perspective of the user;

generating at least one search from the query and the context, wherein generating the at least one search from the query and the context comprises:

identifying a gesture in the at least one image;

processing the at least one image to identify an object referenced in association with the query based on the gesture; and generating the at least one search based on the query, the context, and the object;

obtaining at least one result for the at least one search;

determining a response to the query based on the at least one result; and providing the response to the user of the device.

18. The non-transitory computer-readable storage medium of claim 17, wherein generating the at least one search from the query and the context comprises:

processing the at least one image to identify a text descriptor associated with the object in the at least one image; and generating the at least one search based on the query, the context, the object, and the text descriptor.

19. The non-transitory computer-readable storage medium of claim 17, wherein the context comprises a history associated with input provided by the user to the device before obtaining the query.

20. The non-transitory computer-readable storage medium of claim 19, wherein the context comprises a user profile, the user profile indicating at least one preference associated with the user or at least one attribute associated with the user.

\* \* \* \* \*